United States Patent [19]
West

[11] 3,854,734
[45] Dec. 17, 1974

[54] BEARING SEAL ASSEMBLY
[75] Inventor: James E. West, Ann Arbor, Mich.
[73] Assignee: Hoover Ball and Bearing Company, Saline, Mich.
[22] Filed: Feb. 3, 1971
[21] Appl. No.: 112,462

Related U.S. Application Data
[63] Continuation of Ser. No. 821,663, May 5, 1969, abandoned.

[52] U.S. Cl................. 277/170, 277/94, 308/187.2
[51] Int. Cl. .............................................. F16c 1/24
[58] Field of Search ............ 277/170, 94, 169, 206, 277/168; 308/187.1, 187.2

[56] References Cited
UNITED STATES PATENTS
3,032,346 5/1962 Sullivan ............................ 277/168
3,396,977 8/1968 Iguchi................................. 277/94
3,423,140 1/1969 Cowles............................ 277/183 X FOREIGN PATENTS OR APPLICATIONS
800,550 11/1950 Germany ........................ 308/187.7

Primary Examiner—Samuel B. Rothberg
Attorney, Agent, or Firm—Finn G. Olsen; James E. Stephenson

[57] ABSTRACT

A seal especially adapted for use with an integral shaft bearing of a water pump. The seal has a rubber element which is held in a state of compression at its outer periphery against a shoulder of an outer race of the bearing and a pair of lips spaced axially at its inner periphery are in engagement with a shaft, the inner lip assuring lubrication retention and the outer lip assuring contamination rejection.

7 Claims, 2 Drawing Figures

PATENTED DEC 17 1974　　　　　　　　　　　3,854,734

INVENTOR
JAMES E. WEST

BY Olsen and Stephenson
ATTORNEYS

BEARING SEAL ASSEMBLY

This application is a continuation of application Ser. No. 821,663, filed May 5, 1969, and now abandoned.

BACKGROUND OF THE INVENTION

The present invention relates to a bearing sealing assembly and to a seal therefor for sealing the annular space between confronting surfaces of a pair of relatively rotatable members.

The seal of the present invention is particularly suitable for sealing the annular space between an inner shaft and an outer race of a bearing assembly to prevent leakage of lubricant from the bearing and preclude infiltration of dirt or foreign matter into the annular space. Some difficulties have arisen in connection with prior bearing assemblies, because of their inability to provide optimum results with respect to both of these needed functions. In particular, problems have arisen when a relatively high standard of performance has been required of the seal to perform simultaneously both the lubrication retention and contamination rejection functions. Many seals have been provided which can perform one or the other of these functions in a suitable manner but difficulty has arisen when one seal has been required to perform both of these functions satisfactorily.

SUMMARY OF THE INVENTION

The present invention has overcome the shortcomings of the prior art, and in accordance with the present invention there is provided an improved bearing seal assembly which is constructed and arranged to provide optimum lubrication retention and at the same time to provide effective contamination rejection.

According to a preferred form of the invention, a bearing seal assembly is provided comprising a pair of radially spaced relatively rotatable members having confronting surfaces, the outer member being the outer race of a ball bearing, and the inner member being a shaft of a pump. The outer rotatable member or race has defined therein an annular groove with a beveled edge facing the inner rotatable member or shaft. A seal is provided for sealing the annular space between the rotatable members comprising an annular reinforcing element fitted at its outer periphery into the groove, and an annular sealing element including a body portion secured to the reinforcing element and a marginal portion projecting radially inwardly from the body portion and defining at its radially inner extremity axially spaced inner and outer lips. The inner lip has a cylindrical surface seated on the shaft and the outer lip is inclined axially and radially away from the inner lip and is flexed by the shaft into an interference fit therewith. Thus, the inner lip provides a seal for retaining the lubricant within the bearing, and the outer inclined lip provides a seal against contamination from outside the bearing. The body portion of the sealing element is pressed against said beveled surface and the side wall of the groove to provide similar sealing properties at the outer periphery of the seal.

Accordingly, it is an object of the present invention to provide an improved bearing seal assembly and a seal therefor which are constructed and arranged to provide improved lubrication retention and contamination rejection simultaneously.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENT

Figure 1:
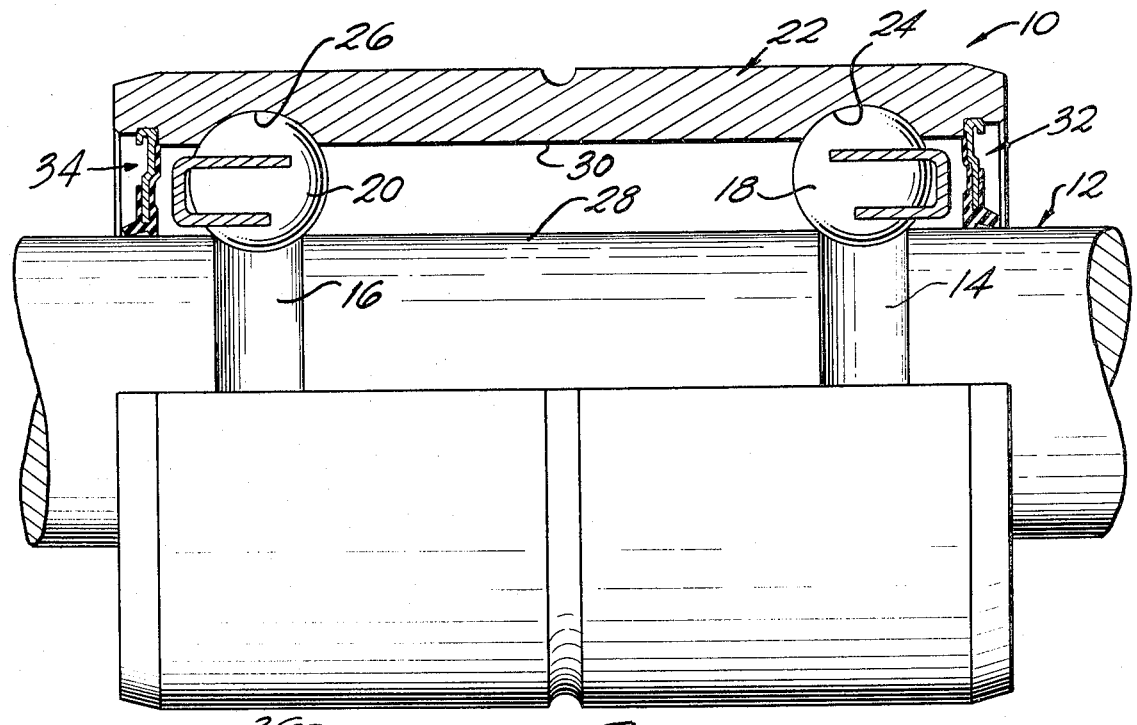
FIG. 1 is a side elevational view with a portion in section showing a bearing assembly in accordance with the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. As there shown, an integral shaft bearing or bearing seal assembly 10 is provided having a rotary shaft 12 with raceways 14 and 16 for the plurality of balls 18 and 20. An outer race 22 is provided which has similar raceways 24 and 26 for the balls 18 and 20 respectively. The pair of radially spaced relatively rotatable members 12 and 22 have confronting cylindrical surfaces 28 and 30 which define an annular space, and seals 32 and 34 are mounted adjacent to the ends of the member 22 for sealing the space between these confronting surfaces.

The outer member 22 defines adjacent to its end a groove 36, a radially directed shoulder 38 and a beveled or frustoconical surface 39. The seal 32 is seated against the shoulder 38 and beveled surface 39, and its outer periphery is fitted into the groove 36.

The seal 32 comprises an annular reinforcing element 40 and an annular sealing element 42 bonded thereto. Normally, the annular reinforcing element 40 is a metal stiffener or shallow cup-shaped ring of metal with a long generally radial flange 44 and a short generally axial flange 46 which when assembled in position will be deflected to the solid line position shown in FIG. 2.

The sealing element 42 normally will be made of a rubber material such as Buna-N and includes a body portion 48 which is bonded to opposite surfaces of the radial flange 44, and a marginal portion 50 projecting radially inwardly from the bottom portion 48 and defining at its inner extremity axially spaced inner and outer lips 52 and 54. The inner lip 54 has a cylindrical surface 56 for seating on the confronting surface 28 of the shaft 12. The outer lip 54 in its unstressed position is inclined radially and axially away from the inner lip 52 and extends to a position radially inward of the cylindrical surface 56, as is shown in broken lines in FIG. 2, and is adapted when mounted on the shaft 12 to be deflected to its solid line position of FIG. 2 to provide an interference fit with the surface 28 of shaft 12.

Figure 2:
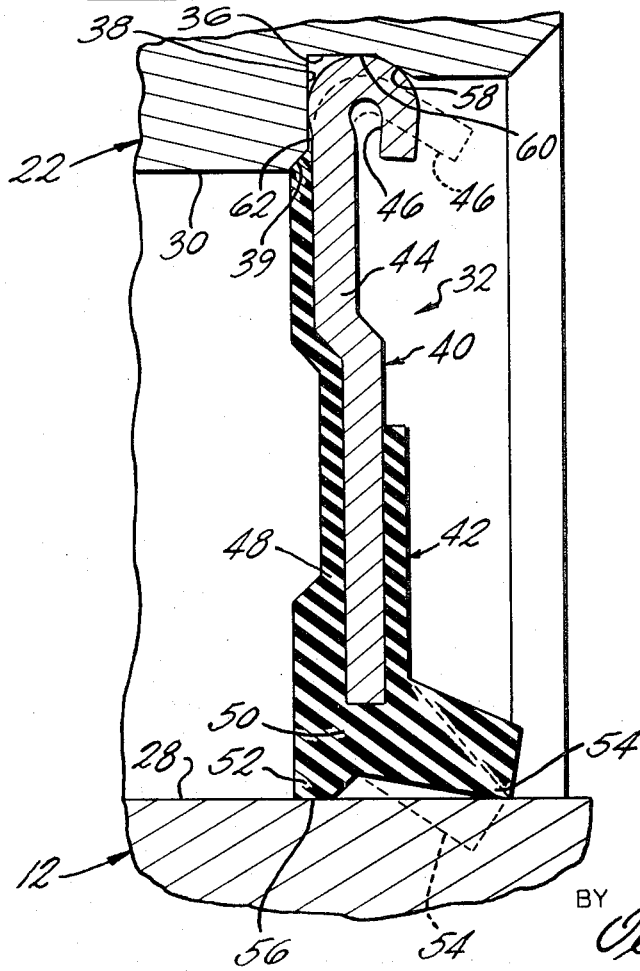
FIG. 2 is an enlarged fragmentary section showing the seal mounted on the two relatively rotatable members, and showing in broken lines the shape of the seal prior to being assembled in position.

When assembling the seal 32 in place, a force will be applied to the outer or terminal end of the generally axially extending flange 46 to press or fold it into the position shown in FIG. 2 wherein it is in a reverse bent position with the outer periphery pressing against the inclined surface 58 and the base 60 of the groove 36. The resilient properties of the metal stiffener or reinforcing element 40 will then compress the body portion 48 against the shoulder 38 and beveled or frustoconical surface 39 as can be seen at 62 to provide both a contamination and lubrication tight joint. The reinforcing element 40 will also function to urge the cylindrical surface 56 against the confronting surface 28 and also to urge the lip 54 against the confronting surface 28 so that lubricant will not leak past the seal 32 nor can dirt and foreign matter infiltrate the interior of the bearing.

From the foregoing description it will be understood that a bearing seal assembly has been provided which will function to prevent leakage of the lubricant from the bearing and at the same time will preclude infiltration of dirt and foreign matter into the annular space between the confronting surfaces of the relatively rotatable members 12 and 22.

It is to be understood that seal 34 is constructed the same as the seal 32, and therefore, need not be described in detail.

It is claimed:

1. A seal for sealing the space between confronting radially inner and outer cylindrical surfaces of a pair of spaced relatively rotatable members wherein the outer cylindrical surface has an annular groove, comprising an annular reinforcing element including a shallow cup-shaped ring of metal with a long generally radial flange and with a short generally axial outwardly directed flange defining the outer periphery of the seal and which can be folded in press-fitting engagement into the groove of said outer cylindrical surface, an annular sealing element including a body portion secured to the radial flange of said reinforcing element and projecting radially inward therefrom and a marginal portion projecting radially inward from the body portion and defining at its radially inner extremity axially spaced inner and outer lips, the inner lip extending in a radial direction normal to the axis of the annular sealing element and having in its unstressed condition a continuous cylindrical surface normal to said radial direction for seating on the outer circumference of said inner cylindrical surface, said continuous cylindrical surface being located axially inward of said radial flange, the outer lip being inclined away from the inner lip and terminating axially outward of said radial flange and radially beyond said cylindrical surface of the inner lip so that it can be deflected radially and axially outward to a position providing an interference fit with said radially inner cylindrical surface, said marginal portion having a relatively large cross-section with said inner lip being relatively short and thick with a radially inner wall parallel to said radial flange and said outer lip being relatively long and thick.

2. A seal as is defined by claim 1, wherein said sealing element is bonded to the axially inner surface of said radial flange and extends radially outward to a position adjacent to the outer periphery of the seal.

3. The combination of a pair of radially spaced relatively rotatable inner and outer members having confronting cylindrical surfaces, means defining an annular groove in the confronting surface of the outer member, said outer member having an annular shoulder adjacent to said groove terminating in its radially inner edge in a beveled surface, an annular sealing means for sealing the annular space between said rotatable members comprising an annular reinforcing element fitted along its radially outer peripheral edge into said groove, an annular sealing element including a body portion secured to said reinforcing element and a marginal portion projecting radially inward from the body portion and defining in its inner extremity axially spaced inner and outer lips, the inner lip being relatively short and thick and extending in a radial direction normal to the axis of the annular sealing means and terminating at its end in a cylindrical surface normal to said radial direction, said cylindrical surface being seated on the cylindrical surface of said inner member, the outer lip being relatively long and thick and inclined away from the inner lip and flexed radially into an interference fit with said cylindrical surface of said inner member, and said sealing element being seated against said shoulder and its beveled surface.

4. The combination as is defined by claim 3, wherein said one rotatable member is the outer race of a bearing and said other rotatable member is a shaft.

5. The combination as is defined by claim 4, wherein said annular reinforcing element is a metal stiffener having a long generally radial flange and a short reverse-bent flange fitted into said groove.

6. The combination as is defined by claim 5, wherein said annular sealing element is a rubber material bonded to the opposite surfaces of the radial flange of said reinforcing element.

7. The combination as is defined by claim 3, wherein the rubber material bonded to the surface of the radial flange is urged by the reverse-bent flange into a state of compression against said shoulder and its beveled surface.

* * * * *